United States Patent
Matsumoto

(10) Patent No.: US 9,967,822 B2
(45) Date of Patent: May 8, 2018

(54) PORTABLE TERMINAL, METHOD, AND PROGRAM FOR EXECUTING TRANSMISSION AND RECEPTION OF DATA

(71) Applicant: Yoshinori Matsumoto, Osaka (JP)

(72) Inventor: Yoshinori Matsumoto, Osaka (JP)

( * ) Notice: Subject to any disclaimer, the term of this patent is extended or adjusted under 35 U.S.C. 154(b) by 0 days. days.

(21) Appl. No.: 15/191,759

(22) Filed: Jun. 24, 2016

(65) Prior Publication Data

US 2016/0309414 A1  Oct. 20, 2016

Related U.S. Application Data

(63) Continuation-in-part of application No. 14/014,808, filed on Aug. 30, 2013, now abandoned.

(30) Foreign Application Priority Data

Sep. 5, 2012 (JP) ................. 2012-195150

(51) Int. Cl.
 *H04B 1/38* (2015.01)
 *H04W 52/02* (2009.01)
 *G06F 1/32* (2006.01)
 *H04W 88/02* (2009.01)

(52) U.S. Cl.
 CPC ...... *H04W 52/0245* (2013.01); *G06F 1/3206* (2013.01); *G06F 1/3215* (2013.01); *G06F 1/3278* (2013.01); *H04W 52/0209* (2013.01); *H04W 88/02* (2013.01); *Y02B 60/126* (2013.01); *Y02B 60/50* (2013.01); *Y02D 10/157* (2018.01); *Y02D 70/00* (2018.01); *Y02D 70/164* (2018.01)

(58) Field of Classification Search
 CPC ............ Y02D 70/00; H04W 52/0229; H04W 52/0245; H04W 52/0209
 USPC ................ 455/574, 226.2, 343.2–343.5, 566
 See application file for complete search history.

(56) References Cited

U.S. PATENT DOCUMENTS

| | | | | |
|---|---|---|---|---|
| 8,009,602 B2* | 8/2011 | Hui | .................. | H04W 52/0261 370/311 |
| 8,326,348 B2* | 12/2012 | Choi | ................. | H04W 52/0245 455/552.1 |
| 8,331,995 B2* | 12/2012 | Hevizi | ............. | H04W 52/0203 455/507 |
| 8,532,718 B2* | 9/2013 | Behzad | ............ | H04W 52/0229 455/574 |
| 8,681,671 B1* | 3/2014 | Hui | .................. | H04W 52/0225 370/311 |
| 2004/0152495 A1* | 8/2004 | Choi | ................ | H04W 52/0229 455/574 |
| 2007/0082647 A1* | 4/2007 | Behzad | ............ | H04W 52/0229 455/343.1 |

(Continued)

*Primary Examiner* — Edward Urban
*Assistant Examiner* — Rui Hu
(74) *Attorney, Agent, or Firm* — Simpson & Simpson, PLLC; S. Peter Konzel, Esq.

(57) ABSTRACT

To provide a portable terminal, method or/and program that can reduce the energy consumption by automatically transmitting and receiving data based on the signal strength, rather than the user manually transitioning from sleep mode to active mode. The terminal processing means commands the terminal to transition from the sleep mode to active mode based on the signal strength, and the data transmission and/or reception means to perform data transfers.

20 Claims, 6 Drawing Sheets

(56) References Cited

U.S. PATENT DOCUMENTS

| | | | |
|---|---|---|---|
| 2008/0171568 A1* | 7/2008 | Choi | H04W 52/0245 |
| | | | 455/522 |
| 2009/0103597 A1* | 4/2009 | Choi | H04W 52/0245 |
| | | | 375/222 |
| 2011/0143706 A1* | 6/2011 | Oue | H04M 1/72538 |
| | | | 455/404.1 |
| 2011/0193809 A1* | 8/2011 | Walley | G06F 3/044 |
| | | | 345/173 |
| 2012/0009926 A1* | 1/2012 | Hevizi | H04W 52/0203 |
| | | | 455/436 |
| 2012/0101952 A1* | 4/2012 | Raleigh | G06Q 30/016 |
| | | | 705/304 |

* cited by examiner

PORTABLE TERMINAL, METHOD, AND PROGRAM FOR EXECUTING TRANSMISSION AND RECEPTION OF DATA

CROSS REFERENCE TO RELATED APPLICATIONS

This application is a continuation-in-part of U.S. patent application Ser. No. 14/014,808 filed Aug. 30, 2013, which application claims priority to Japanese Pat. App. No. 2012-195150 filed on Sep. 5, 2012, the disclosures of which are herein incorporated by reference in their entireties.

BACKGROUND OF THE INVENTION

1. Field of the Invention

This invention relates to a portable terminal, method and program for transmitting and receiving data and relates specifically to a sleep and activation feature.

2. Description of Related Art

The recent addition of high-functioning and multi-functioning features to portable phones has been contributing to the increase of energy consumption by these portable phones. Enlarging the battery capacity is quite difficult, considering the size and weight of these phones. Transitioning the phones into sleep mode when they are not in use enables the reduction of energy consumption level.

The terminals enter into a sleep mode when they do not receive data for a certain amount of time, and recover from the sleep mode once they begin receiving data, as it is cited in the patent documents (e.g., Japanese Unexamined Patent Application Publication No. 2004-104465 and Japanese Unexamined Patent Application Publication No. 2004-64328).

However, the method mentioned above required users to open a data transfer application to check if any data has been saved while the terminal had a weak signal. In order to use the terminal after the change in the signal strength, users were required to transition from sleep mode to a normal mode, and open a data transfer application. This process causes unnecessary consumption of energy for the users.

This invention aims to provide a program for transmitting and receiving data depending on the signal strength without requiring user's operation, thus saving energy consumption.

SUMMARY OF THE INVENTION

This invention provides a portable terminal to perform the following steps:

Characteristic 1:

A portable terminal including data transmission and/or reception means for transmitting and/or receiving data via a wireless communication network, the portable terminal including: measurement means for measuring signal strength of the wireless communication network; sleep means for establishing the portable terminal in a sleep mode, according to the communication intensity measured by the measurement means; sleep means for establishing the portable terminal, according to the signal strength, activation means for activating the portable terminal, according to the signal strength measured by the measurement means; and terminal processing means for, when the portable terminal is activated by the activation means, causing the data transmission and/or receiving means to perform data transmission and/or reception via the wireless communication network, and if the data transmission and/or reception completes, establishing the portable terminal in the sleep mode, by the sleep means According to the invention according to characteristic 1, the portable terminal is transited from a sleep mode to an active mode according to the signal strength, and an application for data transmission and/or reception is activated. When data transmission and/or reception completes, the portable terminal is transited to the sleep mode again.

Therefore, even if a user does not operate the portable terminal, it becomes possible to reliably receive data stored in a data server, according to the signal strength and there is no need to undesirably transit from the sleep mode to a normal mode and thus power consumption can be restrained.

The invention according to Characteristic 1 attains the similar functions and effects in program and method as well as those of the portable terminal in the category of the invention.

Characteristic 2:

In the invention according to Characteristic 1, the measurement means further includes time measurement means for, when the signal strength of the wireless communication network is detected to be lower than a predetermined strength, measuring an elapsed time from when the strength is detected, and the sleep means establishes the portable terminal in the sleep mode when the measurement means has not successfully detected the signal strength that is higher than the predetermined signal strength even after the time measurement means has measured the predetermined elapsed time.

Characteristic 2 presents that if the signal does not recover for a predetermined period of time, then the terminal transitions into a sleep mode.

Therefore, when the portable terminal is in an environment in which the signal strength is weak, transition into the sleep mode is established, whereby unnecessary data transmission and/or reception are/is not performed.

Characteristic 2 may be applied not only to a portable terminal, but program and/or method, with the similar effects.

Characteristic 3:

In the inventions according to Characteristics 1 and 2, the terminal processing means is means for, when the measurement means detects that the signal strength of the wireless communication network is higher than the predetermined strength, causing the data transmission and/or reception means to carry out data transmission and/or reception via the wireless communication network, and if the data transmission and/or reception completes, causing the sleep means to establish the portable terminal in the sleep mode.

According to the invention according to Characteristic 3, data transmission and/or reception are/is performed when the signal strength is high, whereas no data transmission and/or reception are/is performed when the signal strength is weak and thus data transmission and/or reception can be reliably performed, and redundant power consumption can also be restrained.

Characteristic 3 may be applied not only to a portable terminal, but also to a program and/or method, with the similar effects.

Characteristic 4:

Operation determination means for determining the presence or absence of operation with respect to the portable terminal, and the terminal processing means is means for, when the operation determination means determines that an operation is made, cancelling sleep processing exerted by the sleep means.

According to the invention according to Characteristic 4, when the user is in operation, the sleep processing is canceled regardless of the signal strength. Therefore, even if the signal strength becomes weak when the user is in operation, it is possible to prevent the sleep processing from being mistakenly performed.

Characteristic 4 may be applied not only to a portable terminal, but also to a program and/or method, with the similar effects.

Characteristic 5:

In addition to any one of Characteristics 1 to 4, display unit determination means for determining whether or not information is displayed on a display unit of the portable terminal is further provided. The terminal processing means is means for, when the display unit determination means determines that a display is present, canceling the sleep processing exerted by the sleep means.

Characteristic 5 presents that the sleep means will be halted when the display is in use, regardless of the signal strength. Thus, the fact that the portable terminal is in use is determined by determination of the display unit determination means, and it is possible to prevent the sleep mode from being established when the user is using the portable terminal.

This means prevents the terminal from mistakenly transitioning into a sleep mode when the display is in use for a long period of time-such as when the user is watching videos on the terminal.

Characteristic 5 may be applied not only to a portable terminal, but also to a program and method, with the similar effects.

This invention provides a portable terminal, as well as a program, to conserve energy by automatically transmitting and receiving data according to the signal strength, rather than the user manually transitioning the terminal from one mode to another.

Finally, a portable terminal in accordance with the invention is capable of transmitting and receiving data through a wireless network and includes an input device which a user can operate, a display device capable of displaying an image, and a controller. The controller is programmed so as to execute the processing of (A) measuring a signal strength of the wireless network and (B) transmitting and receiving data by activating an application configured to perform data transmission and/or reception when a state continues for a predetermined time, the state being a state in which the input device is not operated by the user, the image is not displayed on the display device and the signal strength measured in the processing (A) exceeds a standard level, and then transitioning the portable terminal into a sleep mode in which the application is not activated, by terminating the application.

DESCRIPTION OF THE PREFERRED EMBODIMENTS

Figure 1:
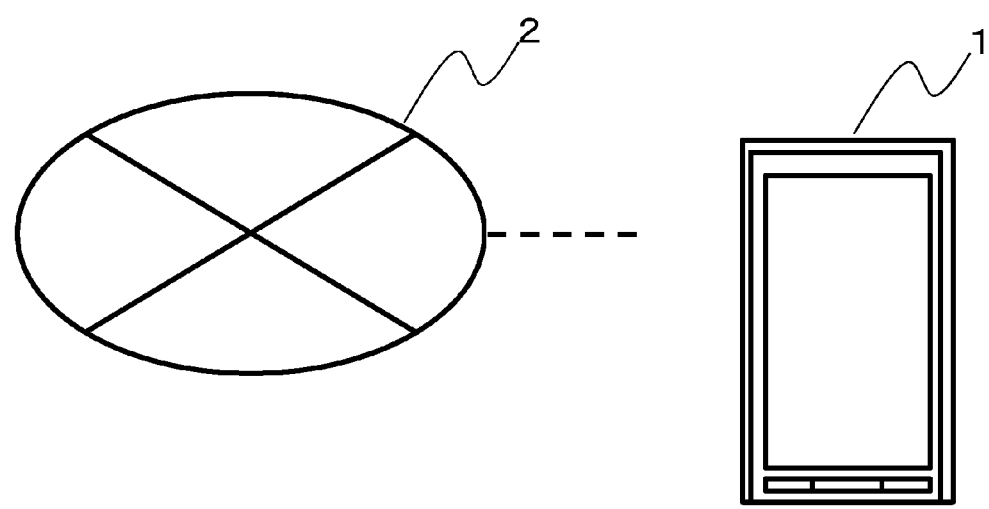
FIG. 1 explains an outline of this embodiment.
Figure 2:
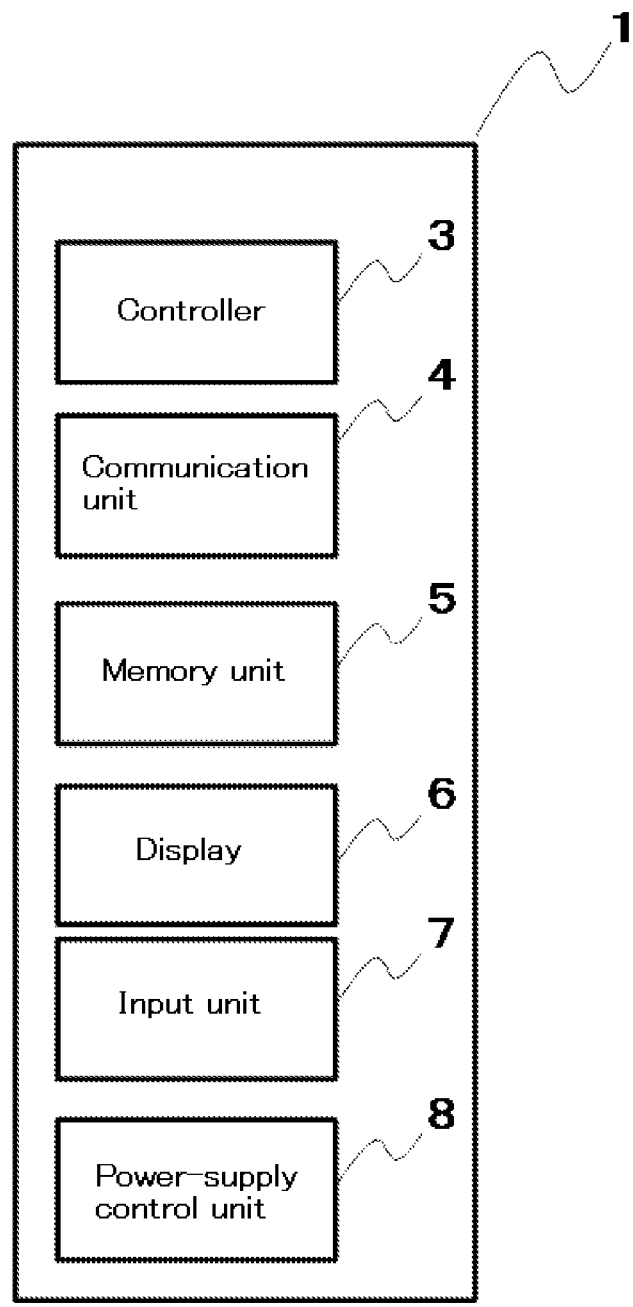
FIG. 2 illustrates a structure block of portable terminal 1.

Hereinafter, preferred embodiments of the present invention will be described with reference to the accompanying drawings. Incidentally, these preferred embodiments are merely illustrative, and the technical scope of the present invention is not limited thereto. Referring to FIG. 1 and FIG. 2, an outline of the present embodiments will be described. As shown in FIG. 1, a portable terminal 1 performs wireless communication via a wireless communication network 2. The portable terminal 1 is an information electrical appliance which a user uses as a terminal such as a cellular phone, a portable information terminal, a smart phone, or a netbook terminal, for example.

The portable terminal 1, as shown in FIG. 2, includes a control unit 3, a communication unit 4, a storage unit 5, a display unit 6, an input unit 7, and a power control unit 8. The portable terminal 1 includes a broadcasting device, although not shown. The broadcasting device is for example, a speaker such as a voice output device, a vibrator, or an output device such as a light-emitting diode. It is preferable that the portable terminal 1 originally include the broadcasting device or the speaker.

The control unit 3 includes a CPU (Central Processing Unit), a RAM (Random Access Memory), a ROM (Read Only Memory), or the like. The communication unit 4 includes a wireless communication device, and performs data transmission and/or reception by an antenna, although not shown. The storage unit 5 includes either or both of an HDD (Hard Disk Drive) and an SSD (Solid State Drive). The display unit 6 includes a liquid crystal monitor or the like to display an image. On the display unit 6, objects are displayed. The objects as used herein are display items to be displayed on the portable terminal 1, for example, files stored in the portable terminal 1 and icons or the like to be displayed by the applications or the like activated by the portable terminal 1.

The input unit 7 includes buttons to accept inputs from the user or a touch panel included in the display unit 6.

The power control unit 8 includes a battery or the like to supply power for operating the portable terminal 1.

Figure 3:
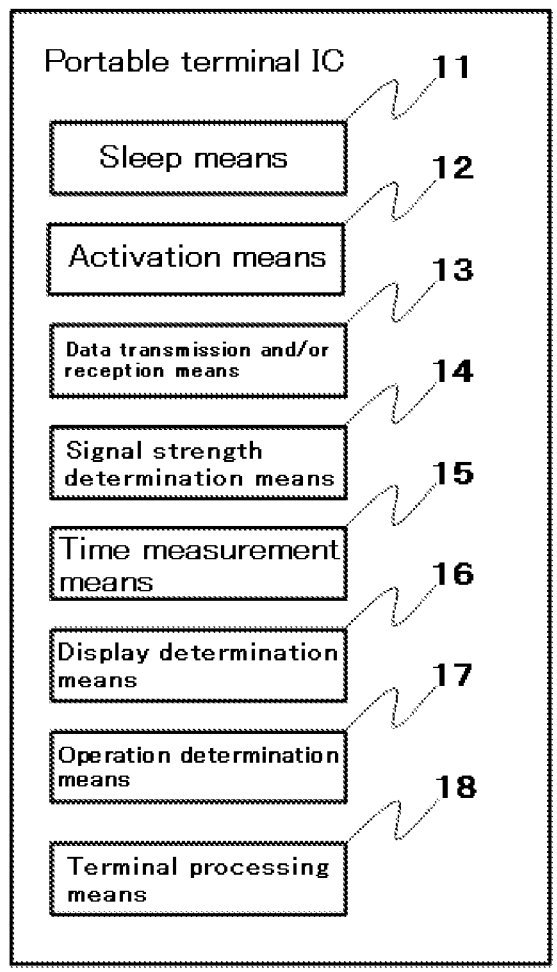
FIG. 3 illustrates a function block of portable terminal 1.

As indicated in FIG. 3, portable terminal 1 is provided with sleep means 11, activation means 12, data transmission and/or reception means 13, signal strength determination means 14, time measurement means 15, display determination means 16, operation determination means 17, and terminal processing means 18. These means are executed by controller 3, communication unit 4, memory unit 5, display 6, input unit 7, and/or power-supply control unit 8.

Sleep means 11 has a feature of transitioning the portable terminal 1 into a sleep mode. The sleep mode, according to this invention, is defined as a state where power-supply control unit 8 stops providing electric power supply to most of the internal devices while remaining to provide electric power supply to at least data transmission and/or reception means 13 and signal strength determination means 14.

Activation means 12 has a feature of activating the portable terminal 1 from a sleep mode. Active mode is defined as a state where an application required to perform data transmission and/or reception by the data transmission and/or reception means 13 is activated. Data transmission and/or reception means 13 has a feature of performing data transmission and/or reception through wireless network 2.

The signal, received by the data transmission and/or reception means 13, is measured by the signal strength determination means 14. Signal strength determination means 14 determines whether the strength of the received signal exceeds a standard signal level A. The data of the standard signal level may be stored in the memory unit 5, or other parts such as the controller 3. The standard signal level A is not limited. For example, if levels 0 to N are indicated on the display in a stepwise fashion as a signal level, those levels may be the standards. Specifically, the standard signal level A may be a value which satisfies the maximum level N or a level higher than N−1.

Time measurement means 15 has a feature of measuring a time elapsed since the signal strength measurement means 14 determines the signal strength. The data of the measured time is sent to the controller 3 to be used for processing performed by the terminal processing means 16, which will be described later.

Display determination means 16 determines whether an object is shown on display 6.

Operation determination means 17 determines whether input unit 7 is operated.

Terminal processing means 18 activates the portable terminal 1 from a sleep mode by the activation means 12, performs data transmission and/or reception by the data transmission and/or reception means 13, and transitions the terminal into a sleep mode once the data transmission and/or reception is complete.

Figure 4:
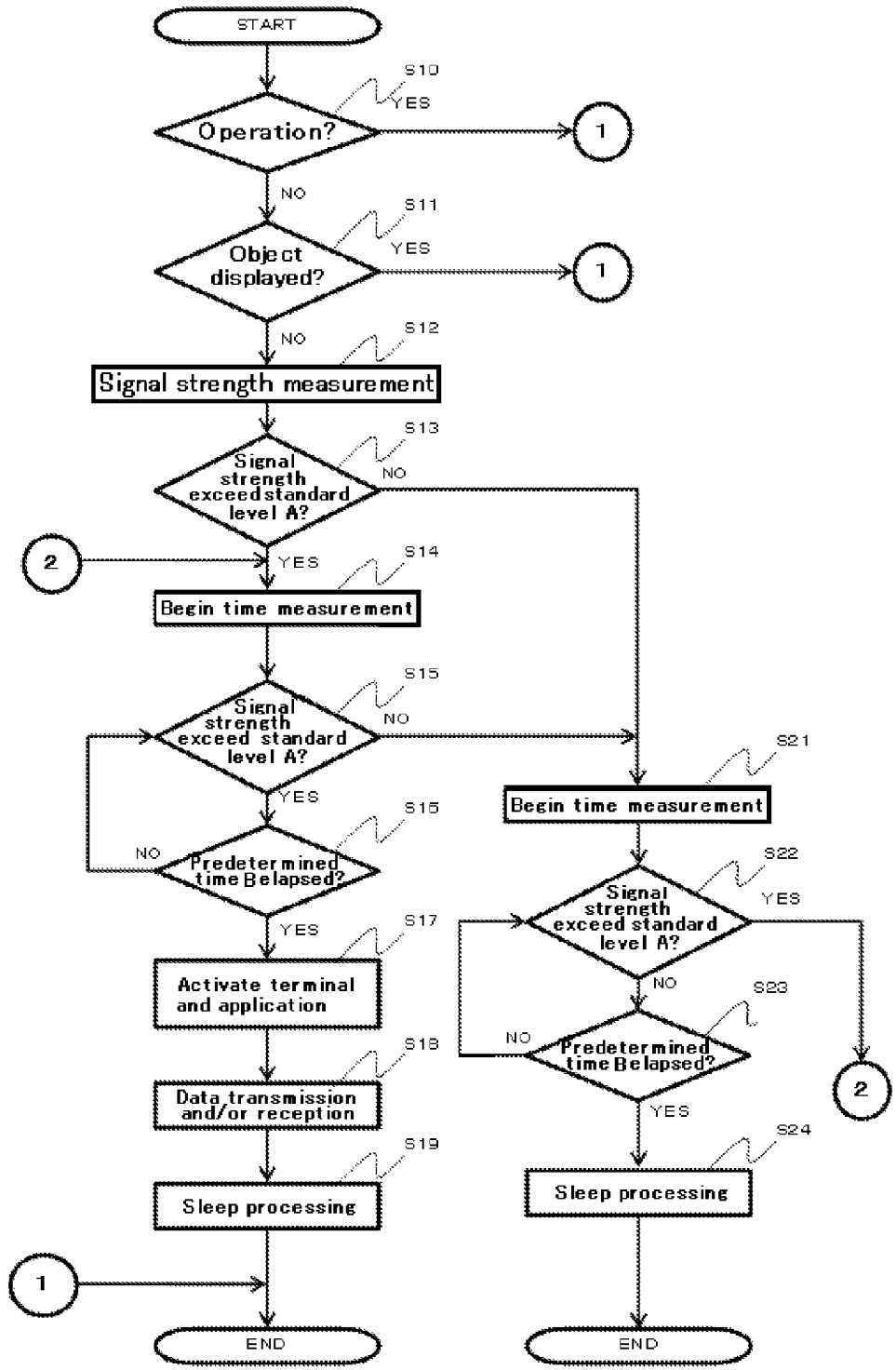
FIG. 4 illustrates a flow of the processing terminal 1 executes

FIG. 4 shows a flow of the processing.

First, the portable terminal 1 determines whether or not the user is currently in operation by the operation determination means 17 (step S10). This operation determination is for example, performed by determining whether the user is making any input to the portable terminal 1 by the input unit 7. Therefore, even if the signal strength becomes weak when the user is in operation, it is possible to prevent sleep processing from being mistakenly performed.

Secondly, the terminal determines whether an object(s) is shown on display 6, by the display determination means 16 (Step S11). In Step S10 and Step S11, it is determined whether the terminal is currently in a sleep mode. In Step S10 and Step S11, the terminal does not transition into a sleep mode if the user is operating the terminal, or an object is shown on display 6. These prevent the terminal from transitioning into a sleep mode, for example, when the user is watching a video on the terminal.

Signal strength determination means 14 measures the strength of the signal received by the data transmission and/or reception means 13 (Step S12), and determines if the measured strength exceeds the standard level A (Step S13).

When the signal strength determination means 14 determines that the signal strength received by the data transmission and/or reception means 13 exceeds a standard signal level A (Step S13 YES), the time measurement means 15 starts measurement of time (Step S14). The time measured by the time measurement means 15 is transmitted to the control unit 3. The signal strength determination means 14 determines again whether the signal strength received by the data transmission and/or reception means 13 exceeds the standard signal level A (Step S15). When the signal strength determination means 14 determines that the reference value A is exceeded (Step S15 YES), the control unit 3 determines whether the time measured by the time measurement means 15 in Step S13 or subsequent has elapsed beyond a predetermined time B stored in the storage unit 5 (Step S16).

The data of the predetermined time B is stored in memory unit 5. The predetermined time B is not limited but may preferably be a time expected to allow for steady communication. The predetermined time B may preferably be not less than 1 second and less than 10 minutes, more preferably not less than 5 seconds and less than 5 minutes, yet more preferably not less than 10 seconds and less than 3 minutes, most preferably not less than 30 seconds and less than 1 minute. For example, when communication is interrupted intermittently, it is preferable not to initiate data communication. The predetermined time B may be 0. In Step S15, if the signal strength satisfies the standard level A, Step S17 may be initiated immediately.

When the control unit 3 determines that the time measured by the time measurement means 15 in Step S13 or subsequent has elapsed beyond the predetermined time B (Step S16 YES), the terminal processing means 18 transits the portable terminal 1 to the active mode by the activation means 12 and then activates an application to perform data transmission and/or reception (Step S17). Then, the terminal processing means 18 causes the data transmission and/or reception means 13 to perform data transmission and/or reception (Step S18). When the processing associated with the data transmission and/or reception means 13 completes, the terminal processing means 18 terminates the application and then establishes the portable terminal 1 in the sleep mode (Step S19).

The terminal processing means 18 then executes data transmission and/or reception by the data transmission and/or reception means 13 (Step S18). In Step S18, a predetermined alarm may be given by the alarm device on completion of the data transmission and/or reception. For example, audio output, vibration output, or light output may be performed selectively or in combination. The manner of alarm activation may change depending on the status of such as data reception. For example, the manner of alarm activation may change according to the signal strength in data transmission and/or reception. This enables a user to know of completion of data transmission and/or reception without viewing display 6, and to learn the signal strength. When it is expected to take a great deal of time for data transmission and/or reception, for example over 5 minutes, 10 minutes, 30 minutes, or 1 hour, a user may be requested to enter to select whether to perform this communication. Whether to perform communication under this situation may be preset. For example, a user may preset a threshold value of such as an expected time taken for data transmission and/or reception, or such as data capacity. It may be controlled so that when exceeding the threshold value, data transmission and/or reception will not be performed. When the processing related to the data transmission and/or reception means 13 is complete, the terminal processing means 18 terminates the application, and transitions the terminal into a sleep mode (Step S19).

In Step S13 and Step S15, if the signal strength determination means 14 determines that the strength of the signal received by the signal data transmission and/or reception means 13 falls below the standard level A (Step S13 NO, 15 NO), the time measurement means 15 begins a time measurement (Step S21). The measured time is sent to the controller 3. The signal strength determination means 14 again determines whether the strength of the signal received by the data transmission and/or reception means 13 exceeds the standard level A (Step S22). If the signal strength determination means 14 determines that the signal strength falls below the standard level A (Step S22 NO) and the controller 3 determines whether the time which the time measurement means 15 has measured since Step S21 has elapsed a predetermined time C (Step S23 YES), the terminal processing means 18 will transition the terminal into a sleep mode by sleep means 11 (Step S24). The predetermined time C is not limited but may preferably be a time expected to allow the signal strength to be maintained below the standard level A for a continuous period of time. Namely, when decrease of the signal strength continues only for a short time, it is preferable not to go into the sleep mode.

If the signal strength determination means 14 determines that the strength of the signal received by data transmission and/or reception means 13 exceeds the standard level A (Step S22 YES), the terminal returns to Step S14. If a user operates portable terminal 1 during this routine, it is preferable to perform interrupt processing to end this routine. Accordingly, if a user carries out an operation during the routine, the sleep processing is halted. If this occurs during data transmission and/or reception, it is preferable to continue data transmission and reception. It may be controlled so that the interrupt processing is performed only when a user operates portable terminal 1 after transitioning into the sleep mode in Step S19 or Step S24.

Step S10 and Step S11 may be performed in the reverse order. Therefore, the display determination means 16 may first determine whether an object is shown on display 6, and then determine whether the user is operating the terminal, by operation determination means 17.

When a user is in an environment where the signal strength is weak, the aforesaid processing enables data transmission and/or reception to be performed automatically after the signal strength improves. This allows a user to automatically perform data transmission and/or reception when the signal strength improves, thereby eliminating the need to unnecessarily transition the terminal from the sleep mode to the active mode. This lowers energy consumption.

The aforementioned means, units, features and functions are realized by a computer reading and executing predetermined programs (including CPU, data process device, and other terminals). The application programs are supplied in the forms of such as flexible discs, CD (CD-ROM), DVD (DVD-ROM and DVD-RAM), and other computer readable medium. In this case, the computer loads the application program from the medium, sends the program to an internal or external memory unit, and executes the program. The program may also be firstly stored in memory devices such as magnetic discs, optical discs, and magneto-optical discs, and then supplied to the computer through communication lines.

This concludes the embodiment of this invention; however, this invention is not limited to the aforesaid embodiments. The effects and results stated in this embodiment were enumerated as the most ideal results, and the effects of this invention are not limited to the ones mentioned in the embodiment.

Modification Example

In the above embodiments, of the signal strength, in particular, when the received signal strength, i.e., the strength of a so called RSSI (Received Signal Strength Indication, Received Signal Strength Indicator) is high, an external device (for example, a server of a telecommunications company) was caused to execute inquiry as to whether there is any e-mail to the potable terminal 1 or an arrival by phone call, etc. This modification example is characterized in that when data of its large data capacity stored in the storage unit 5 of the portable terminal 1 is attached to e-mail or is uploaded to an external server, output timing determination means for determining whether the timing of e-mail transmission or timing of uploading to the external server is transmitted or uploaded according to the signal strength is added to the control unit 3. Namely, when the user pastes picture data or mobile data of its large capacity or voice data to an e-mail or a message application, if the signal strength determination means 14 determines that a transmission enable mode is established, transmission is controlled. However, even if the signal strength at which communication is enabled has been obtained, there may be a case in which transmission is momentarily enabled.

Namely, since large capacity data is transmitted, it is self-evident that a certain period of time is required for transmission, and if transmission is performed as a trigger of the establishment of a state in which transmission is momentarily enabled, a signal strength at which transmission is enabled is kept to be low or zero until the transmission has completed, and there newly arises a problem that there is a high possibility of an occurrence of a transmission error.

That is, such a transmission error can frequently occur during vehicle movement or the like, and in such a case, there is a high possibility that it can be determined whether the portable terminal 1 is in a static state or exists in stable signal strength, according to the fact that the reference value A preset as the threshold value of the signal strength has elapsed the predetermined time, through the processing operations in Step S14 to S16 described above; and therefore, transmission can be started while the elapsed time of the reference value A is employed as a second trigger of starting transmission.

However, in addition to detecting the elapsed time for maintenance of the standard signal level A, when it is detected that the portable terminal 1 is not moving, i.e., when it is detected that the controller 3 is in a static state of the portable terminal 1 by referring to position movement detection means such as a GPS detector or an acceleration sensor included in the portable terminal 1 (this fact does not mean that no position movement is made, and it can be determined that the terminal exists in a predetermined range), and that the portable terminal 1 does not positionally move during a predetermined time, the controller 3 is configured to control transition from the sleep mode to the active mode and then start transmission. The flow of control in the case where the controller has been thus configured will be described with reference to FIG. 5 and FIG. 6.

Figure 5:
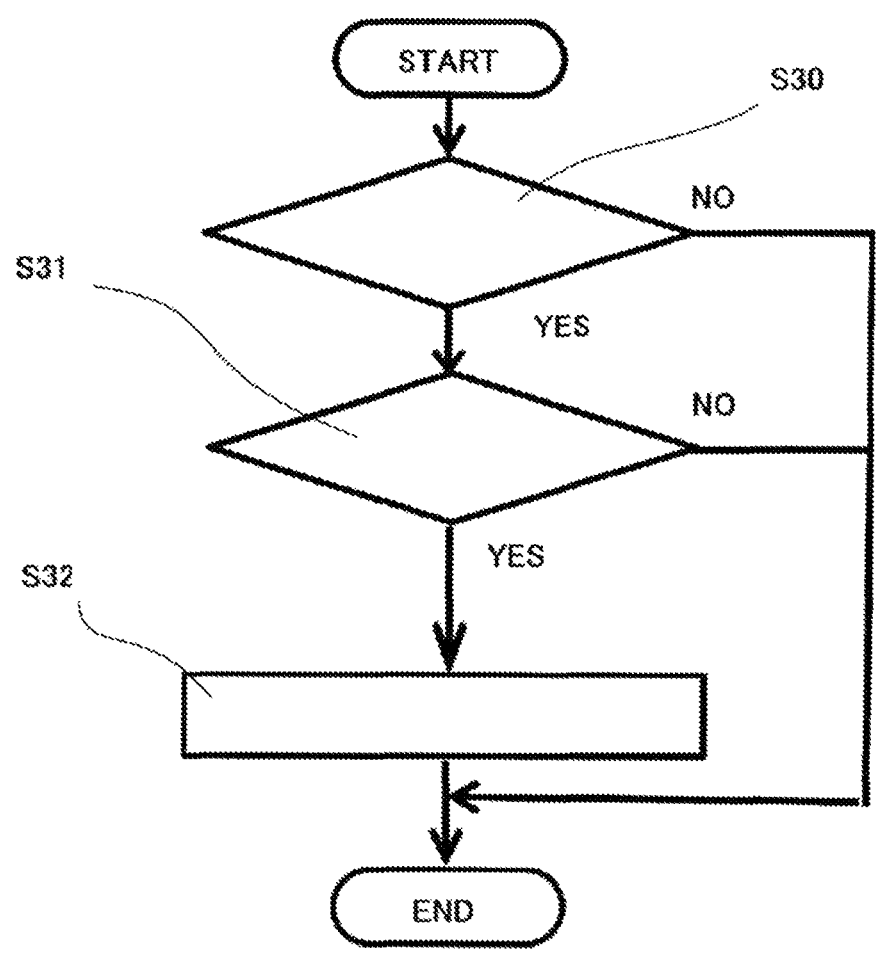
FIG. 5 is a flowchart of a transmission subroutine.

Referring to FIG. 5, the user uses the portable terminal 1 and then controller 3 determines whether or not transmission of large capacity data of the threshold value or more has been carried out by operation of the input unit 7 (Step S30). The storage unit 5 stores, in advance, data of a data capacity of a comparison destination which is the threshold value for determining whether or not to make the determination in Step S30. The controller 3 executes comparison processing associated with the data of the data capacity of the comparison destination, and it is thereby determined that transmission of the large capacity data of the threshold value or more has been carried out by operation of the input unit 7 (Step S30: YES). If it is determined that transmission of the large capacity data of the threshold value or more is not determined by operation of the input unit 7, the transmission subroutine is terminated. Incidentally, although in this example, it is determined whether or not transmission of the large capacity data of the predetermined threshold value or more has failed, all of the data that has not been successfully transmitted can be organized to be stored in the storage unit as shown in Step S32 which will be described later. An internal memory is used as a memory in the storage unit that is a storage target; and however, there is a possibility that such an internal memory is not always capable of allocating an enough memory space to store all the data; and therefore, Step S30 is organized to perform determination of data volume as well as mere determination of whether or not transmission occurs. Accordingly, in the processing of Step S30, it may be merely determining whether or not a transmitting operation is made in place of determining whether the data volume is the threshold value or more in comparison with the value of the data volume of the comparison destination storing the transmission data volume in advance.

Next, the controller 3 determines whether or not transmission completes (Step S31). If the signal strength is low or unstable on the way of transmission or if the signal strength becomes zero and then communication stops, it is determined that the communication has failed and become incomplete (Step S31: NO). If transmission has been completed (Step S31: YES), the transmission subroutine is terminated.

If transmission has failed, the controller 3 stores, in the storage unit 5, the transmission data that has not been successfully transmitted until the subsequent transmission has been triggered (Step S32).

Figure 6:
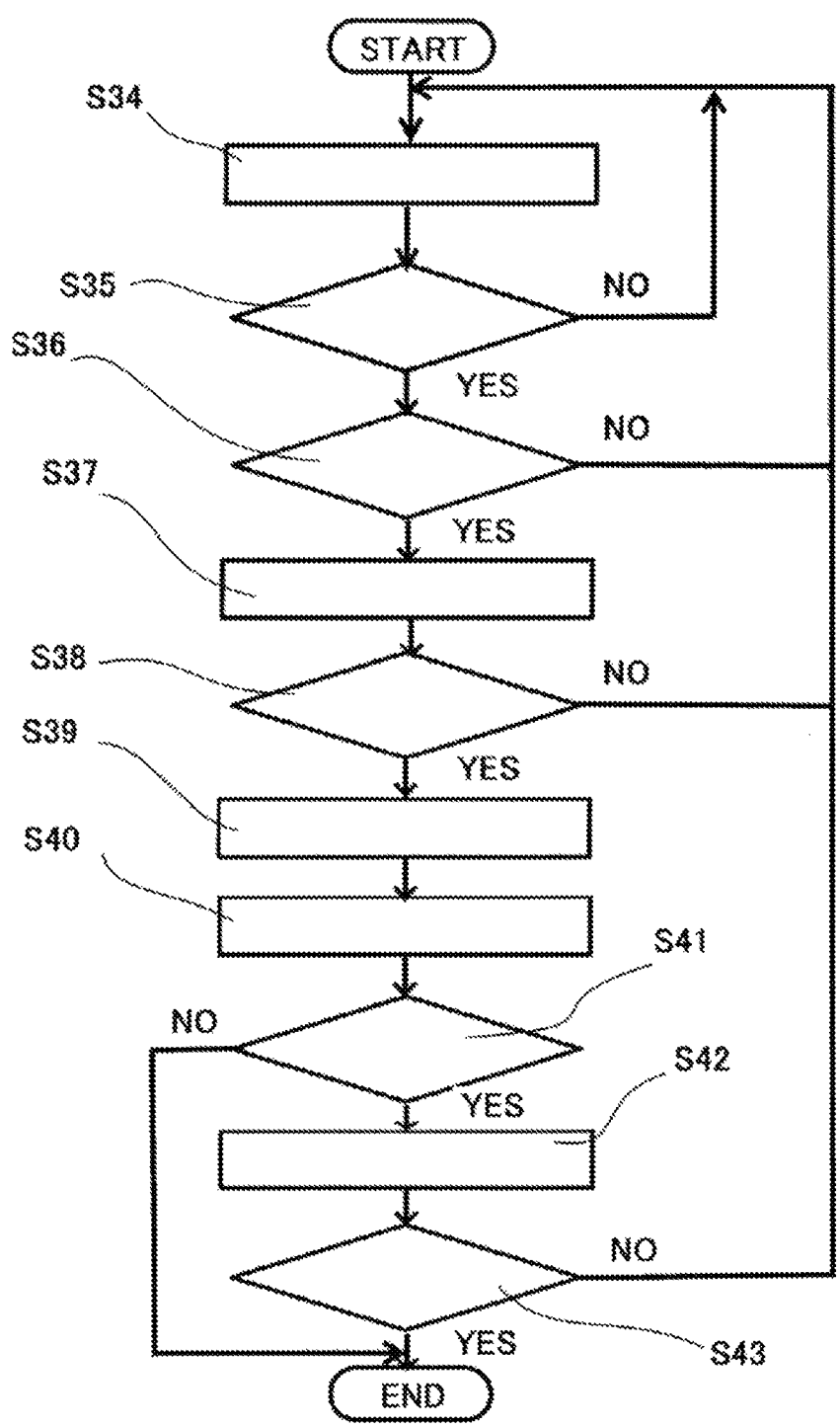
FIG. 6 is a transmission processing flowchart for transmitting temporarily stored transmission data.

Transmission processing after transmission has failed and then the relevant data has been stored in the storage unit 5 as set forth above will be described hereinafter with reference to FIG. 6 illustrating the flow of transmission. Incidentally, in this start state, if the signal strength is obtained as the predetermined value or less and then the predetermined time has elapsed, the controller 5 executes, while leaving, a function of signal strength measurement processing (the processing similar to that in Step S12 of the example described previously), and transits from the active mode to a power saving mode which is the sleep mode. The flow of transmission processing of the controller 3 in FIG. 6 presupposes that the portable terminal 1 starts in the sleep mode.

In Step S33, as in the Step S12, the processing of measuring the signal strength is executed.

In Step S34, as in the Step S13, the controller 3 determines whether or not the signal strength is level A or more. If it is determined that the signal level is level A or higher (Step S35: YES), the controller 3 determines whether or not the transmission data that has not been transmitted yet is stored in the storage unit 5 (Step S36). If it is determined that the signal strength is not level A or higher (Step S35: NO), Step S34 is continued.

In Step S36, it is determined that no transmission is made or transmission data in a transmission ready mode is stored in the storage unit 5 (Step S36: YES), measurement processing of time in a state in which no position movement is made is executed based on the position movement detection means (Step S37). At this time, simultaneously, the time measurement means 15 may be configured to measure the time during which the signal strength A continues. As this time measurement means 15, a crystal oscillator or the like can be appropriately employed.

Next, in Step S37, data from the time measurement means 15 is employed under the control of the controller 3, and it is thereby determined whether or not the elapsed time in the state in which no position movement is made based on the position movement detection means, although not shown, has elapsed beyond the predetermined time B (Step S38). In Step S38, if the elapsed time has not elapsed beyond the predetermined time after position movement has been made (Step S38: NO), the routine transits to Step S34 for signal strength measurement processing. In this case, in the subsequent processing, it is already determined that transmission data which has not been transmitted yet remains in the storage unit 5, and of course, Step S36 can be skipped.

If it is determined by the position movement detection means that the predetermined time B has elapsed in a state in which no position movement is made (Step S38: YES), the controller 3 executes the processing of transiting the portable terminal 1 from the sleep mode to the active mode (Step S39). In the active mode, more programs are in active mode than those in the sleep mode, and the controller 3 is established in a busy mode rather than the sleep mode and thus power consumption becomes high.

In Step S39 after the portable terminal 1 has been established in the active mode, in the next step (Step S40) the controller performs computation processing of the predicted transmission completion time, based on the data volume of the transmission data that has not been transmitted yet, and that is stored in the storage unit 5, and the transmission speed with the communication destination indicative of the signal strength. Afterwards, from a result of the computation processing, display data for displaying the predicted transmission completion time on the display unit 6 is generated and displayed. Based on this display data, information to be displayed on the display unit 6 not only is indicative of the predicted transmission completion time by way of numerals or characters, but also is displayed so as to prompt the user to input whether to execute transmission. Such a display is adapted to be made in consideration of factors which cannot be predicted by the portable terminal 1 such as a circumstance that the portable terminal 1 may not be currently moving, but will be under the ground in accordance with the user's upcoming schedule or a circumstance that a traffic congestion occurred while the user was moving in a vehicle, but the traffic congestion is currently alleviated, and the vehicle may be able to start moving, etc. However, Step S40 is not a mandatory processing step and thus step S41 which follows this Step S40 can also be skipped similarly if Step S40 is skipped.

In Step S41, it is determined whether or not an instruction is supplied as to whether or not the user performs transmission at the predetermined transmission completion time displayed on the display unit 6 in Step S40. The user may desire to perform transmission in a communication area of a toll-free communication carrier, or as described previously, if it is scheduled to move somewhere or to move to an area in which the signal strength obviously weakens, the user may input no transmission by operation of the input unit 7 after visually checking the predicted transmission completion time indicated in Step S40 (Step S41: NO). In this case, the controller 3 terminates the flow of processing shown in FIG. 6.

On the other hand, in Step S41 if the controller 3 detects an input of transmission by operation of the input unit 7 (YES), transmission processing is executed (Step S42).

After Step S41 has been executed, if transmission completes (Step S43: YES), the transmission data that has not been transmitted yet, and that is stored in the storage unit 5, is deleted or is varied so as to have already been transmitted, and the flow of processing shown in FIG. 6 is terminated.

However, in the case of Step S42: NO, namely, although transmission has started, if the signal strength lowers during the transmission and then the transmission does not successfully complete, etc., the routine transits to signal strength measurement processing (Step S34) and then enters a state in which a retransmission timing is monitored.

SUMMARY OF CODES

1: Portable terminal
2: Wireless network
3: Controller
4: Communication unit
5: Memory unit
6: Display
7: Input unit 8: Power-supply control unit
11: Sleep means
12: Activation means
13: Data transmission and/or reception means
14: Signal strength determination means
15: Time measurement means
16: Display determination means
17: Operation determination means
18: Terminal processing means

What is claimed is:

1. A portable handheld electronic communications end user terminal comprising a data transceiver configured to transmit and receive data to/from a base station of a wireless network, the portable handheld electronic communications end user terminal comprising:
   a signal measurement module that measures a signal strength of the wireless network,
   a sleep module that transitions the portable handheld electronic communications end user terminal into a sleep mode based on the signal strength of the wireless network being less than a predetermined signal strength,
   an activation module that activates the portable handheld electronic end user communications terminal based on the signal strength of the wireless network being greater than the predetermined signal strength; and,
   a terminal processing device that directs transmission and reception of data via the wireless network when the portable handheld electronic communications end user terminal is activated, and directs the portable electronic communications end user terminal to transition into the sleep mode upon completion of the transmission and reception of data to/from the wireless network, wherein,
   the terminal processing device further estimates a time period required to complete a transmission and/or reception of a volume of data, based on the volume of data and the signal strength of the wireless network; and in response to the estimated time period exceeding a preset time period, requesting confirmation to proceed with the transmission and/or reception of the volume of data prior to proceeding with the data transmission and/or reception of the volume of data.

2. The portable handheld electronic communications end user terminal of claim 1, wherein, when the signal measurement module detects that the signal strength of the wireless network is less than the predetermined signal strength,
   a time measurement module measures a predetermined period of time that has elapsed after detecting that the signal strength of the wireless network is less than the predetermined signal strength, and
   the sleep module transitions the portable handheld electronic communications end user terminal into the sleep mode when the signal measurement module fails to detect that the signal strength of the wireless network is greater than the predetermined signal strength after the predetermined period of time has elapsed.

3. The portable handheld electronic communications end user terminal of claim 1, wherein, when the signal measurement module detects that the signal strength of the wireless network is stronger than the predetermined signal strength, the terminal processing device directs the transceiver to perform data transmission and reception via the base station of the wireless network, and after completion of the data transmission and reception, directs the sleep module to transition the portable handheld electronic communications end user terminal into the sleep mode.

4. The portable handheld electronic communications end user terminal of claim 1, wherein, when an operation determination module determines that a user is operating the portable handheld electronic communications end user terminal, the terminal processing module interrupts the sleep module and prevents the portable handheld electronic communications end user terminal from transitioning into the sleep mode.

5. The portable handheld electronic communications end user terminal of claim 1, wherein, when a display determination determines that predetermined items are in use and shown on the display, the terminal processing module interrupts the sleep module and prevents the portable handheld electronic end user terminal from transitioning into the sleep mode.

6. The portable handheld electronic communications end user terminal according to claim 1 further comprising an alarm device that activates an alarm after the activation module activates the portable handheld electronic communications end user terminal and transmission and reception of data is completed.

7. The portable handheld electronic communications end user terminal of claim 1, further comprising
   a display device that displays information;
   an input device configured to receive user input;
   a storage device that stores the volume of data, which corresponds to undelivered transmission data when, upon a request to transmit data via operation of the input device, the transmission of the volume of data fails;
   wherein, when the portable handheld electronic communications end user terminal is transitioned into an active mode via the activation module and when the undelivered transmission data is stored in the storage device, the terminal processing device computes the estimated time period based on the volume of the undelivered transmission data stored in the storage device and a transmission speed of the wireless communication network, and based on the computation, generates output data corresponding to the estimated time period, and transmits the generated output data to one or more of the display device, an audio device, or other sensory perceptible device.

8. The portable handheld electronic communications end user terminal according to claim 7, wherein the activation module causes the portable handheld electronic communications end user terminal, having temporarily transitioned into the sleep mode, to transition to the active mode when the signal strength of the wireless network is greater than the predetermined signal strength and is maintained for a preset period of time.

9. The portable handheld electronic communications end user terminal according to claim 7, wherein the sensory perceptible device comprises a vibration producing device.

10. A portable handheld electronic communications end user terminal comprising a non-transitory computer readable storage medium including instructions implementable via a central processing unit of the portable handheld electronic communications end user terminal, the instructions configured to direct the central processing unit to:
   transmit and receive data via a transceiver of the portable handheld electronic communications end user terminal to/from a base station/node of a wireless network;
   measure signal strength of the wireless network via a signal measurement module;
   transition the portable handheld electronic communications end user terminal, via a sleep module, into a sleep mode based on a signal strength of the wireless network being less than a predetermined signal strength;

transition the portable handheld electronic communications end user terminal, via an activation module, into an activated mode based on the signal strength of the wireless network being greater than the predetermined signal strength;

upon activation of the portable handheld electronic communications end user terminal into the activation mode via the activation module, direct data transmission and reception of data via the base station of the wireless network; and upon completion of transmission and reception of date after activation into the activation mode, transition the portable handheld electronic communications end user terminal into the sleep mode, wherein, the instructions are configured to further direct the central processing unit to estimate a time period required to complete a transmission and/or reception of a volume of data, based on the volume of data and the signal strength of the wireless network; and in response to the estimated time period exceeding a preset time period, requesting confirmation to proceed with the transmission and/or reception of the volume of data prior to proceeding with the data transmission and/or reception of the volume of data.

11. The portable handheld electronic communications end user terminal of claim 10, wherein, when the signal measurement module measures that the signal strength of the wireless network that is less than the predetermined strength, a time measurement module measures a predetermined period of time that has elapsed after detecting that the signal strength of the wireless network is less than the first predetermined signal strength, and after the predetermined time has elapsed, the signal measurement module re-measures the signal strength of the wireless network, and when the re-measurement does not measure a signal strength greater than the predetermined signal strength, the sleep module transitions the portable handheld electronic end user terminal into the sleep mode.

12. The portable handheld electronic communications end user terminal of claim 10, wherein, when the signal measurement module detects a signal strength of the wireless network that is greater than the predetermined signal strength, the central processing unit directs transmission and reception of data via the portable handheld electronic communications end user terminal and the base station of the wireless network, and after completion of the transmission and reception of data, the central processing unit directs the sleep module to transition the portable handheld electronic communications end user terminal into the sleep mode.

13. The portable handheld electronic communications end user terminal of claim 10, wherein, when an operation determination module determines that a user is operating the portable handheld electronic communications end user terminal, the central processing unit suspends operation of the sleep module and prevents the portable handheld electronic communications end user terminal from transitioning into the sleep mode.

14. The portable handheld electronic communications end user terminal of claim 10, wherein, when a display determination module determines that predetermined items are in use and shown on the display, the terminal processing module suspends and prevents the sleep module from transitioning the portable handheld electronic communications end user terminal into the sleep mode.

15. The portable handheld electronic communications end user terminal of claim 10, wherein the portable handheld electronic communications end user terminal further comprises an alarm device that activates an alarm after the activation module activates the portable handheld electronic communications end user terminal and transmission and reception of data is completed.

16. A method of controlling a portable handheld electronic communications end user terminal configured for electronic communications with a base station of a wireless network, the portable handheld electronic communications end user terminal comprising:

a transceiver in communication with the base station of the wireless network;
a signal strength measuring module;
a sleep module;
an activation module; and
a terminal processing device, the method comprising:
measuring a signal strength of the wireless network via the signal measuring module;
transitioning the portable handheld electronic communication end user terminal into a sleep mode via the sleep module based on the signal strength being less than a predetermined signal strength;
transitioning the portable handheld electronic communication end user terminal into an active mode via the activation module based on the signal strength being greater than a predetermined signal strength;
transmitting and receiving data to/from the portable handheld electronic communications end user terminal via the base station of the wireless network via the terminal processing device when the portable handheld electronic communications end user terminal is in the active mode; and, transitioning the portable handheld electronic communication end user terminal into the sleep mode after the transmission and reception of data to/from the portable handheld electronic communications end user terminal via the base station of the wireless network has been completed, and estimating a time period required to complete a transmission and/or reception of a volume of data, based on the volume of data and the signal strength of the wireless network, and in response to the estimated time period exceeding a preset time period, requesting confirmation to proceed with the transmission and/or reception of the volume of data prior to proceeding with the data transmission and/or reception of the volume of data.

17. The method of controlling the portable handheld electronic communications end user terminal of claim 16, wherein when the signal measurement module measures a signal strength that is less than the predetermined signal strength, re-measuring the signal strength after a predetermined period of time, and when the re-measurement fails to measure a signal strength greater than the predetermined signal strength, transitioning the portable handheld electronic communications end user terminal into the sleep mode.

18. The method of controlling the portable handheld electronic communications end user terminal of claim 16, wherein when the portable handheld electronic communications end user terminal is activated via the activation module, transmitting and receiving data via the base station of the wireless network, and when the transmission and reception of data is completed, transitioning the portable handheld electronic communication end user terminal into the sleep mode.

19. The method of controlling the portable handheld electronic communications end user terminal of claim 16, wherein an operation determination module determines whether a user is operating the portable handheld electronic communications end user terminal and the terminal processing device suspends and prevents the sleep module from transitioning the portable handheld electronic communications end user terminal into the sleep mode.

20. The method of controlling the portable handheld electronic communications end user terminal of claim 16, wherein a display determination module determines whether a device display is in use and the terminal processing device suspends and prevents the sleep module from transitioning the portable handheld electronic communications end user terminal into the sleep mode.

* * * * *